June 28, 1949.  D. E. KITCHEN  2,474,678
SELF-CLEANING SALT OR PEPPER SHAKER OR DISPENSER
Filed Feb. 6, 1946
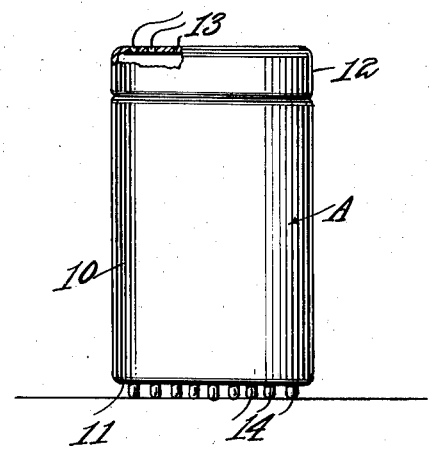
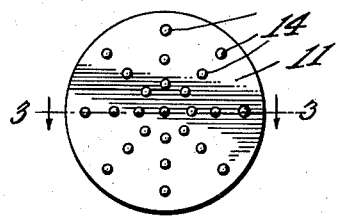
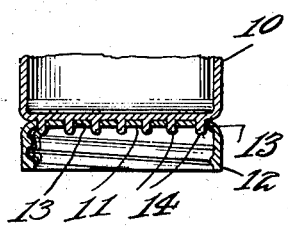
INVENTOR.
Darley E. Kitchen.
BY Victor J. Evans & Co.
ATTORNEYS Patented June 28, 1949

2,474,678

UNITED STATES PATENT OFFICE 2,474,678

SELF-CLEANING SALT OR PEPPER SHAKER OR DISPENSER

Darley E. Kitchen, Logan, Ohio

Application February 6, 1946, Serial No. 645,751

2 Claims. (Cl. 65—57)

The invention relates to a condiment shaker, and more especially to a salt shaker for domestic service.

The primary object of the invention is the provision of a shaker of this character, wherein the dispensing apertures within the cap of the container for salt, can be conveniently cleaned or cleared, so that the salt can be conveniently dispensed on the inverting and shaking of the container in the ususal well known manner.

Another object of the invention is the provision of a shaker of this character, wherein the cleaning medium is built with the body of the container for the salt, and by removing the cap from such container the apertures in such cap can be cleared and cleaned with ease and dispatch, thus eliminating the use of a separate gadget for this purpose.

A further object of the invention is the provision of a shaker of this character, which is simple in construction, thoroughly reliable and effective in operation, strong, durable, neat in appearance, readily and easily operated, assures the dispensing of its content, and inexpensive to manufacture.

With these and other objects in view the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation, partly broken away, of a salt shaker constructed in accordance with the invention.

Figure 2 is a bottom plan view thereof.

Figure 3 is a fragmentary sectional view taken on the line 3—3 of Figure 2 looking in the direction of the arrows, but with the dispensing cap removed from the top of the shaker and applied to the cleaning lugs.

Similar reference characters indicate corresponding parts throughout the several views in the drawing.

Referring to the drawing in detail, A designates generally a container for salt, which comprises in this instance a cylindrical body 10, which is preferably made from plastic material, yet is susceptible of being made from any suitable material, such as metal, glass etc., and also it can be of any other selected shape.

The body 10 has a permanently closed bottom 11, while the other end is open and is adapted to be closed by a removable cap 12, which in this instance is threaded onto the body at its other open end as is common. This body 10 is filled with content, and such cap is provided with dispensing apertures 13, so that when the shaker is inverted and shaken the content thereof will be dispensed through the apertures in the usual well known manner.

The bottom 11 has at its external surface a series of aperture cleaning lugs 14 which are arranged congruous with the location of the apertures 13, in the cap, so that when the latter is removed from the open end of the body 10 and brought to the position shown in Figure 3 of the drawing, the lugs can be caused to enter the apertures 13 for the clearing or cleaning thereof, and thereafter the cap 12 is replaced on the open end of the body 10, with the shaker reassembled for service.

The grouped lugs 14 can be otherwise assembled on the container A so that these can be removed as a unit for use in cleaning the apertures 13 without removing the cap 12, and in this instance the lugs will be carried by a separable section of the body, no further explanation thereof being thought necessary.

What is claimed is:

1. A salt and pepper shaker comprising a container having separable sections, one of said sections having an end portion provided with openings defining a pattern through which the contents may be dispensed, and another of said sections having an end portion defining a base for the shaker, and at least several vertically disposed pins arranged in a pattern corresponding to said first named pattern, said pins having smaller diameters than said openings and rigidly mounted on the outside of said latter end portion and out of contact with the contents of the container for clearing said openings when they become clogged.

2. A dispensing receptacle comprising a container adapted to be filled with salt, pepper and the like, said container having one end provided with openings defining a pattern through which the contents may be dispensed, and another end opposite to the first named end and defining a base for the receptacle, a plurality of vertically-disposed pins for clearing the dispensing openings, said pins being carried on the outside of the container and out of contact with the contents thereof by said last named end, said pins being arranged in a pattern corresponding to said first named pattern of openings and having smaller cross-sectional areas than the corresponding cross-sectional areas of said openings to permit passage of the pins through the openings.

DARLEY E. KITCHEN.

REFERENCES CITED

The following references are of record in the file of this patent:

UNITED STATES PATENTS

| Number | Name | Date |
|---|---|---|
| 313,718 | Fonerden | Mar. 10, 1885 |
| 743,626 | Duffie | Nov. 10, 1903 |
| 1,033,688 | Fuchs | July 23, 1912 |
| 1,213,634 | Havassy | Jan. 23, 1917 |
| 1,238,118 | Edmunds | Aug. 28, 1917 |
| 2,098,832 | Payson | Nov. 9, 1937 |
| 2,185,896 | Jones | Jan. 2, 1940 |

FOREIGN PATENTS

| Number | Country | Date |
|---|---|---|
| 504,181 | Great Britain | Apr. 20, 1939 |